United States Patent [19]

Alig

[11] 4,072,613

[45] Feb. 7, 1978

[54] OZONE REACTOR FOR LIQUIDS

[75] Inventor: Craig S. Alig, Arnold, Md.

[73] Assignee: The United States of America as represented by the Secretary of the Navy, Washington, D.C.

[21] Appl. No.: 729,564

[22] Filed: Oct. 4, 1976

[51] Int. Cl.$^2$ ............................................. C02B 1/38
[52] U.S. Cl. .......................... 210/198 R; 261/121 R; 261/DIG. 42
[58] Field of Search ................. 210/63 Z, 198 R, 220, 210/221 P; 261/121 R, DIG. 24

[56] References Cited

U.S. PATENT DOCUMENTS 1,867,824  7/1932  Hammerly ..................... 210/198 R

FOREIGN PATENT DOCUMENTS 1,046,363  10/1966  United Kingdom ........ 261/DIG. 42

*Primary Examiner*—Frank A. Spear, Jr.
*Assistant Examiner*—Richard W. Burks
*Attorney, Agent, or Firm*—R. S. Sciascia; Q. E. Hodges

[57] ABSTRACT

An ozone reactor having two elongated chambers mounted coaxially. The outer chamber having closures at each end and the inner chamber being smaller in cross section and being mounted in spaced relation to the outer chamber as well as being spaced from the end closures of the outer chamber. The outer chamber has inlet and outlet ports for admitting and exhausting the liquid. Mounted near the bottom end of the inner chamber is a sparger for introducing bubbles containing ozone which rise to the top of the liquid causing a circulation flow between the two chambers and up through the inner chamber. There may also be a stirrer mounted to extend into the inner chamber to cause a breakup of the ozone containing bubbles thereby speeding the dissolving of the ozone into the liquid. Also there may be included a spray mounted to control the foaming of the liquid.

5 Claims, 1 Drawing Figure

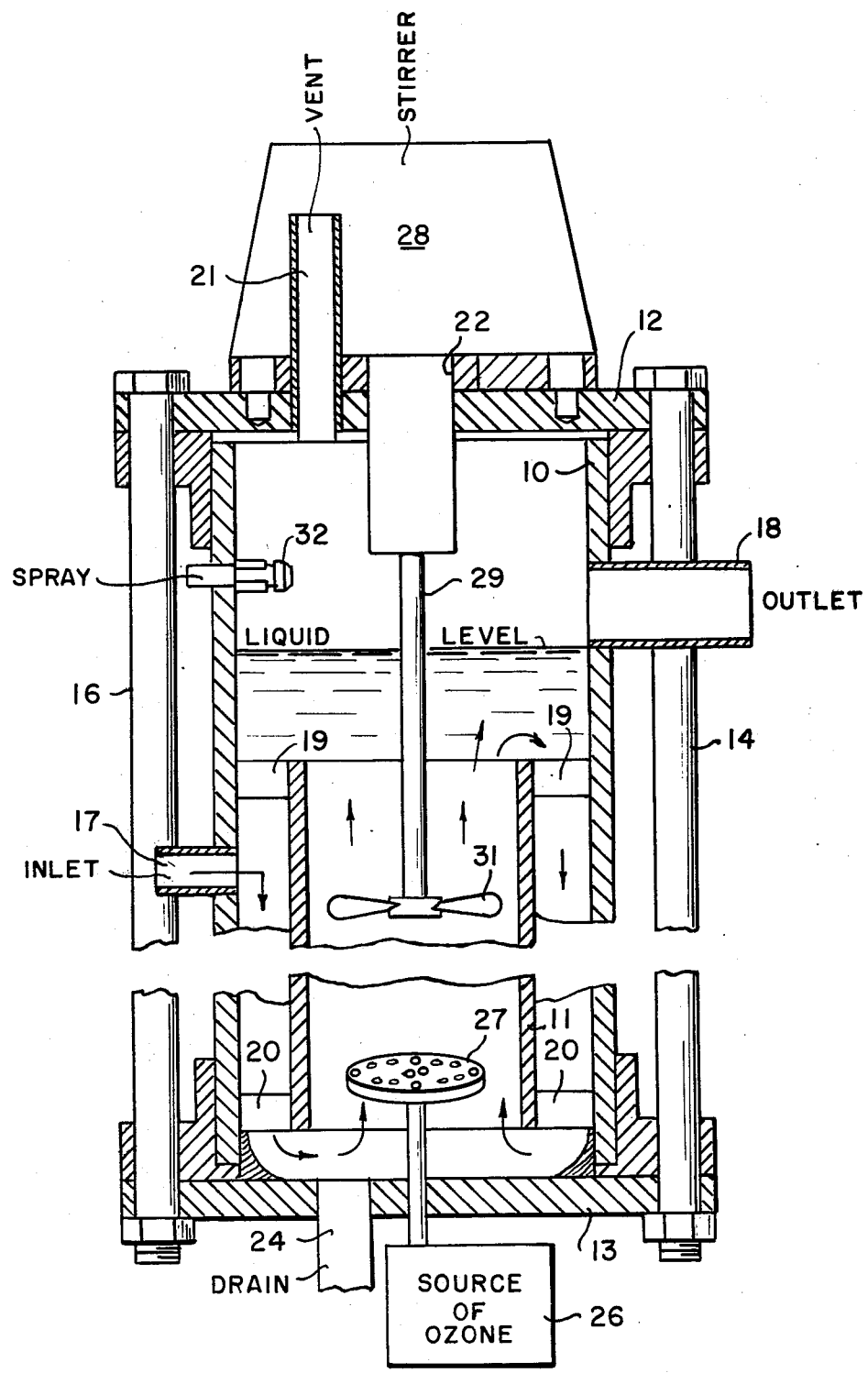

OZONE REACTOR FOR LIQUIDS

The invention described herein may be manufactured and used by or for the Government of the United States of America for governmental purposes without the payment of any royalties thereon or therefor.

BACKGROUND OF THE INVENTION

It has long been known that ozone is very effective in the purification of water, in some oxidation reactions and in ozonalysis. In the carrying out of these applications of ozone several techniques and apparatus have been developed, including the batch treatment in which the ozone is introduced into a container of the liquid being treated and allowed to remain for a suitable length of time before being drawn off and a second batch is introduced. Another treatment technique employs flowing the liquid through a series of chambers to provide the desired contact with ozone that is introduced into the chambers.

The best art known to applicant is the article appearing in Water and Sewage Works of December 1975, Pages 57–60, entitled "Techniques for dispersing and Dissolving Ozone in Water, Part 1", by W. Masschelein, G. Fransolet and J. Genot. FIG. 5 of this article resembles the structure of applicants invention but functions entirely differently.

SUMMARY OF THE INVENTION

The invention in this application relates to the ozonation of a liquid in an efficient manner with a device capable of handling suspended particulate matter in the liquid without becoming clogged with sediment.

BRIEF DESCRIPTION OF THE DRAWING

The FIGURE shows an embodiment of the invention in vertical secton, broken away.

DESCRIPTION OF THE PREFERRED EMBODIMENT

Referring now to the FIGURE where like numbers refer to corresponding parts, there is disclosed as a preferred embodiment an ozone reactor for the treatment of waste water. The device consists of an outer chamber 10 and an inner chamber 11, which may conveniently be cylindrical in form, mounted coaxially. The outer cylinder has end closure members 12 and 13 which may clamp the outer cylinder between them by means of rods 14 and 16. The outer cylinder has inlet opening 17 and outlet opening 18 preferably in the sides of the cylinder and the outlet 18 being spaced from the upper end of the outer cylinder 10 and closure 12 to maintain the liquid level spaced from the end closure 12. The inner cylinder 11 is spaced from the outer cylinder 10 by tabs 19 and 20 with tabs 20 also supporting the inner cylinder 11 above the end closure 13. The upper end closure 12 has shown a vent opening 21 and a drive shaft opening 22 which is used if a stirrer 28 is used, it being recognized that in some applications the stirrer may not be needed. The lower closure 13 has openings for a drain 24 and for connection to a source of ozone under pressure 26.

Mounted within the lower portion of the inner cylinder 11 is an ozone sparger 27 which is connected through the end closure 13 to the source of ozone 26. The stirrer 28 may be mounted on the upper closure 12 and have a shaft 29 extending into upper portion of cylinder 11 and having a stirrer blade 31. When used, the stirrer, which itself forms no part of this invention, serves to break up the ozone containing bubbles to speed the dissolution of the ozone in the liquid. As described the system is at atmospheric pressure with the vent being open to the atmosphere. If it is found to be needed, a spray nozzle 32 may be incorporated into the system to control foaming of the liquid. The nozzle would be connected to a source of pressurized fluid (not shown).

In operation the wastewater is introduced into the reactor through the inlet 17. As shown by the flow arrows, it is then caused to flow downward between the two cylinders then up through the inner cylinder 11 by the flow of the gas bubbles containing ozone which are introduced into the inner cylinder 11 through sparger 27. The liquid recirculates over the top of cylinder 11, which does not extend to the level of outlet 18, and back down between the two cylinders. In normal operation the sediment in the influx of water is kept from settling out on the bottom by the rate of flow around the bottom of cylinder 11 and, where found necessary, by the inclusion of filler material in the corners between the bottom closure 13 and the outer cylinder 10 to provide for the smooth flow of the liquid around the corner.

It should be understood that the structural material of this device which contacts the ozone must be inert to the ozone. Some such materials are polyvinyl chloride, some stainless steels, aluminum etc. The heighth of the column is to be determined by the treatment time required for the purpose intended. For bacteria the time can be quite short when sufficient ozone is present in the liquid.

What is claimed is:
1. An ozone reactor for liquids comprising:
a first means for containing a liquid;
a second means within said first means for producing an inner compartment and an outer compartment within said first means, said compartments being intercommunicating;
a third means for introducing bubbles containing ozone into said inner compartment to produce a flow of liquid from said outer compartment through said inner compartment and thereby react the liquid with the ozone, wherein said third means comprises a sparger connected to a source of ozone under pressure.

2. An ozone reactor as claimed in claim 1 wherein the first means is an elongated chamber having closures at each end.

3. An ozone reactor as claimed in claim 2 wherein the second means is an elongated chamber of uniform and smaller cross section than said first means and which is mounted coaxially of the first means, and in spaced relation to the end closures of said first means.

4. An ozone reactor as claimed in claim 3 in which the spacing between said second means and the bottom end closure is such as to cause a sweeping out of all sediment under normal flow conditions.

5. An ozone reactor as claimed in claim 3, which includes a liquid spray nozzle mounted above the liquid level for controlling foam formation.

* * * * *